Oct. 7, 1969    W. W. MORRIS    3,471,232
FILM TRANSPORT MEANS
Filed May 6, 1966    2 Sheets-Sheet 1
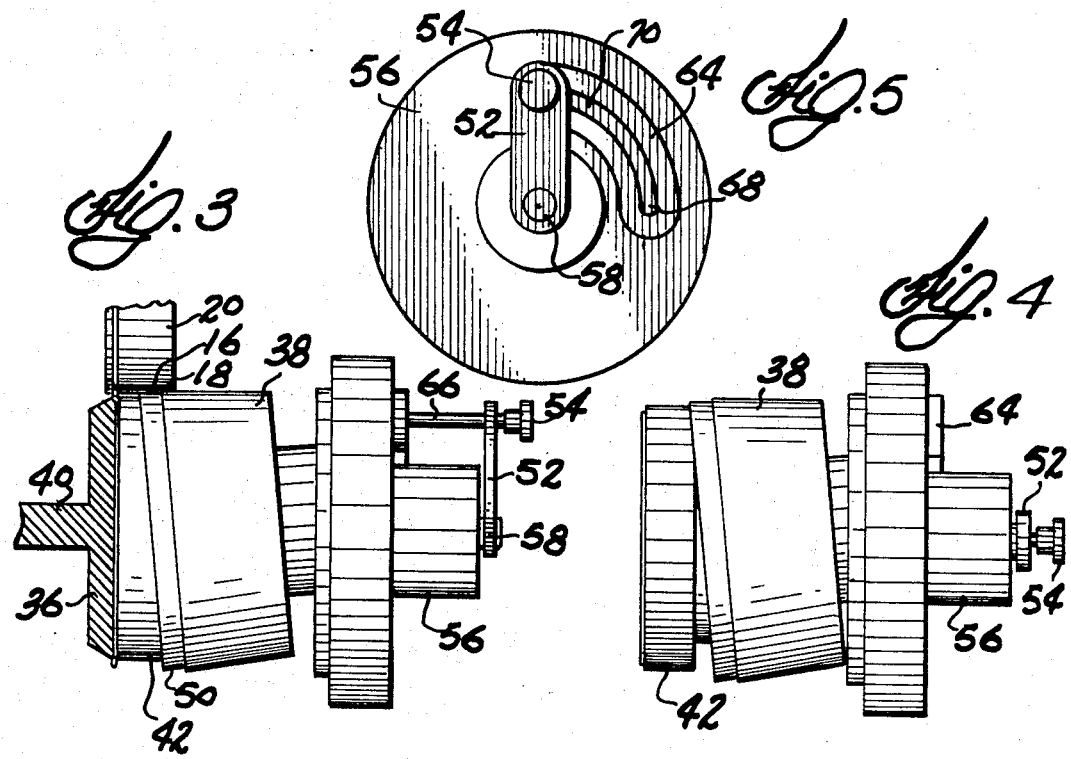
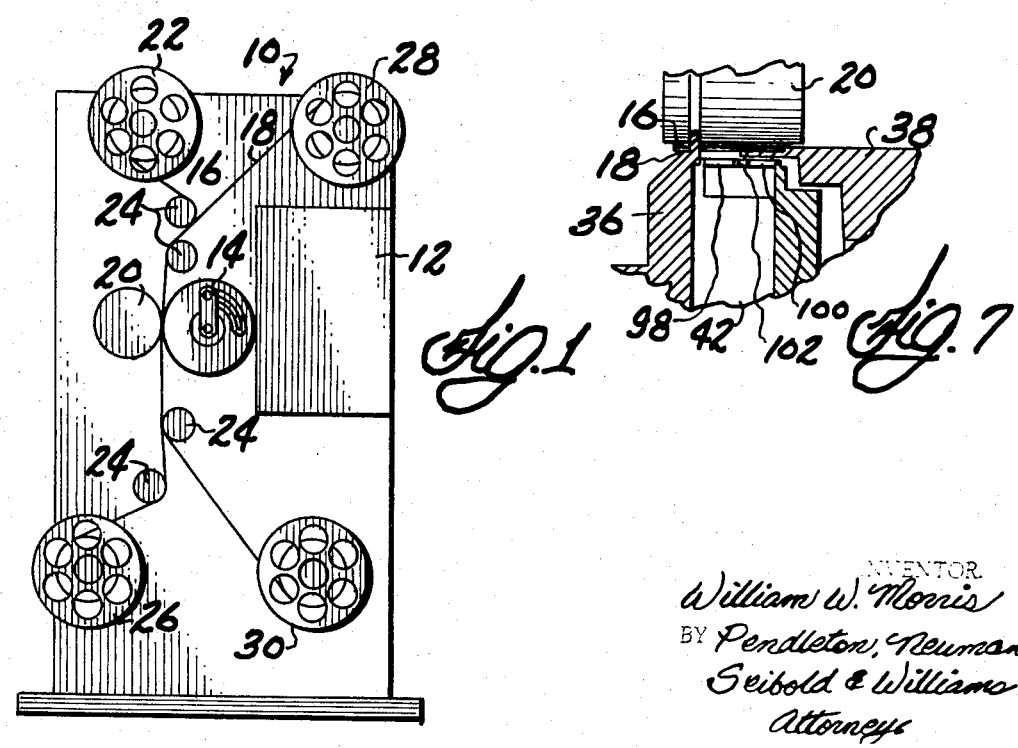
INVENTOR.
William W. Morris
BY Pendleton, Neuman,
Seibold & Williams
Attorneys Oct. 7, 1969   W. W. MORRIS   3,471,232
FILM TRANSPORT MEANS
Filed May 6, 1966   2 Sheets-Sheet 2
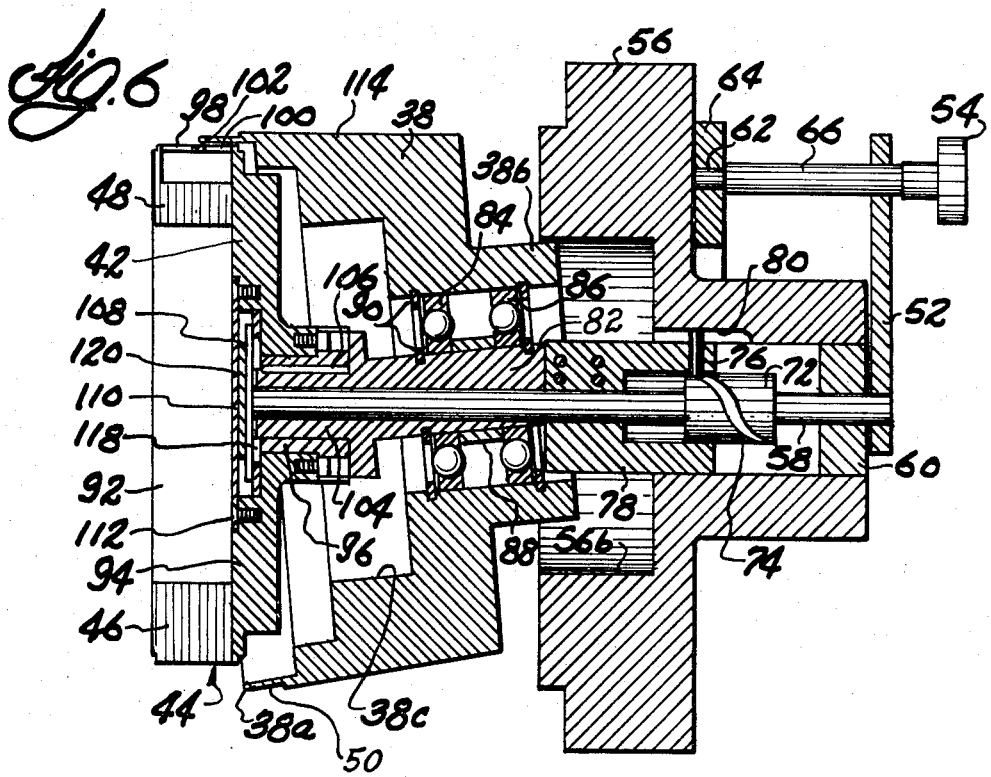
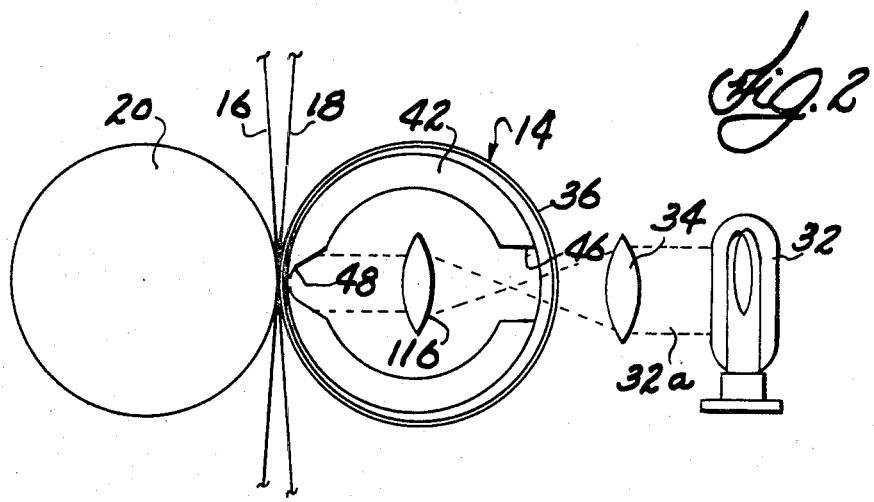
INVENTOR.
William W. Morris
BY Pendleton, Neuman,
Seibold & Williams
Attorneys

United States Patent Office 3,471,232
Patented Oct. 7, 1969

3,471,232
FILM TRANSPORT MEANS
William W. Morris, Skokie, Ill., assignor to Motion Picture Printing Equipment Co., Skokie, Ill., a corporation of Illinois
Filed May 6, 1966, Ser. No. 548,229
Int. Cl. G03b *27/22*
U.S. Cl. 355—104
13 Claims

ABSTRACT OF THE DISCLOSURE

A motion picture film printing assembly for supporting and transporting photosensitive film through an exposure station. The printing assembly has a sprocket wheel adjacent to one side of the exposure aperture of the station for transporting the film by the station and a frustoconical drum rotatably mounted on the other side of the aperture for supporting one edge of the film as it is transported by the exposure aperture. The drum is mounted on an axis which is at an acute angle with respect to the exposure aperture and has a mechanism for moving the drum between a first position in which the exposure aperture is partially masked by the outer edge or supporting surface of the drum and a second position in which the exposure aperture is not masked by the outer edge of the drum thereby increasing the area of the film exposed to the light.

---

This invention relates to film transport means and, more particularly, to an improved aperture assembly for supporting film and transporting such film past a light source.

During the handling of motion picture film and particularly during the preparation of printed copies from an original or master film, it is common to engage the film only along the edges thereof and to provide sprocket means which engage the film holes for drive purposes.

In particular, in film printing equipment it is required that the unexposed film and the original or master be maintained in intimate contact and a precise relationship as the undeveloped film is exposed to a source of light through the original. This has, in the past, created certain technical problems because of the requirement that the film be firmly supported along its edges at the point of exposure while providing a controlled source of light of substantial brilliance between those edges.

There are two common types of motion picture film printers, the so-called "continuous printer" and an intermittent or frame printer. The foregoing problems, as well as the solution taught by this invention are equally pertinent with respect to both types.

In one particular piece of equipment heretofore employed, two rotating supports engage the edges of both the unexposed and original film and transport the film past a light source. The films are driven continuously with the light source projected unto the films through a small space between the supports. Such a system produces substantial limitations upon the nature and character of the light source which can be employed and upon the intensities of light available. These problems are especially manifest in systems designed for the smaller film sizes such as eight millimeter film.

It is, therefore, one object of this invention to provide an improved film transport system which will positively engage and transport the film past a light source while providing an enlarged path between the light source and the film.

It is another object of this invention to provide an improved aperture assembly which has greater flexibility than those heretofore employed and which is capable of adaptation for use with films of various sizes and types.

It is another object of this invention to provide an improved film transport and aperture assembly which has enhanced efficiency and improved light capabilities resulting from the employment of a canted drum.

It is still another object of this invention to provide an improved aperture assembly which can be employed with existing motion picture copying equipment without significant design changes.

Further, and additional objects of this invention will become manifest from this description, the accompanying drawings and the appended claims.

In one particular embodiment of this invention the improved aperture assembly is designed as a direct replacement for a conventional aperture assembly in existing printing equipment. The improved assembly includes a sprocket wheel having spaced teeth on the periphery thereof which engage the film sprocket holes, and a film supporting drum spaced therefrom and having a conic surface adjacent to the sprocket wheel and spaced therefrom to provide a film aperture. The drum is mounted on a canted axis so that an increment of the conic surface is aligned with a portion of the sprocket and adapted to support the unexposed and original films therebetween. These two members define what is herein referred to generally as a film plane and they support the films in close spaced relationship with respect to an aperture member having a film aperture formed therein.

In the preferred form of the invention, a resilient contact wheel engages both the sprocket wheel and the drum and presses against the original and negative films to maintain intimate contact therebetween and against the wheel and drum. The conic drum is movable along the axis of the aperture assembly so that the system may be utilized with various film sizes.

For a more complete understanding of the invention, reference will now be made to the accompanying drawings wherein:

FIGURE 1 is a diagrammatic view of a motion picture printing device incorporating the improved film transport;

FIG. 2 is a schematic diagram of the light system of the embodiment of FIG. 1;

FIG. 3 is a fragmentary view of the aperture assembly in a first position for single frame exposure;

FIG. 4 is a partial view of the aperture assembly in a second position adapted for double frame exposure;

FIG. 5 is an end view of the aperture assembly of FIG. 4;

FIG. 6 is a sectional view of the aperture assembly of FIG. 4; and

FIG. 7 is a fragmentary view illustrating the disposition of the original and unexposed films on the aperture assembly.

Referring now to the drawings, and more particularly to FIG. 1, a piece of motion picture copying equipment 10 is illustrated wherein a light from a source contained within housing 12 is projected through a lens assembly and through the aperture assembly 14 onto unexposed film 16 through a developed original or master 18. The unexposed film 16 and original film 18 are supported against the aperture assembly 14 by a contact roller 20 in such a manner that registry is maintained and the two film media are maintained in intimate contact and moved simultaneously.

The unexposed film 16 is stored on a supply reel 22 and fed through a system of guide rollers 24 past the aperture assembly 14 and onto an undeveloped film storage reel 26. Similarly, the original or master film 18 is stored on a supply reel 28 and fed over the guide rollers 24 onto a take-up reel 30.

The illustration of the printing equipment is rudimentary for purposes of demonstrating the location and usefulness of the aperture assembly of this invention. It will be understood that the illustration is not intended as a complete or precise configuration or as one which illustrates all of the various features of equipment of this kind.

For example, there is, in most such equipment, provision for controlling the light intensity by sensing cuing information disposed on the original or master film and utilizing this information to modulate the light source. In addition to such light control means, additional cuing information may be sensed and control of parameters may be exercised. In color film, for example, cuing information is utilized to control both hue and intensity of the light source.

Furthermore, if the equipment is designed for reproducing sound motion pictures, provision is made for adding the sound to the film during copying.

The aperture assembly 14 is provided with a rotatable crank 52 which adjusts the assembly to selectively reproduce various film widths. In the described embodiment this adjustment is utilized to shift between single frame exposure when the crank 52 is in the upright position shown, and double frame exposure when the crank is rotated through a 90° arc.

FIG. 2 is an enlarged schematic diagram of the actual optical system and aperture assembly. The light source 32, which is disposed within the light source housing 12 of FIG. 1, projects light along the path 32a through an optical system diagrammatically shown as a single lens 34. This beam of light is projected into the aperture assembly 14 and onto the unexposed film 16 through the original film 18. The contact roller 20 back up the films and maintains the two films in intimate contact against the rotating portions of aperture assembly 14.

Aperture assembly 14 is generally illustrated in FIGS. 3–7. Referring specifically to FIG. 3, the contact roller 20 is shown in fragmentary form abutting against a rotatably mounted sprocket wheel 36 and a rotatably mounted drum 38. The original film 18 and unexposed film 16 are compressed between the contact roller 20 and the edge of drum 38 and sprocket wheel 36. The sprocket wheel 36 is mounted on a shaft 40 coaxial with an aperture means 42 while the drum is mounted at an angle with respect thereto. The aperture means 42 has a generally cylindrical wall with diametrically opposed openings disposed therein to pass a beam of light entering along the line indicated by arrow 44. The nature of the openings in the aperture means 42 are illustrated in FIG. 2, where it can be seen that an enlarged opening 46 is disposed adjacent the optics 34 and a small shaped opening 48 is disposed adjacent the film. The opening 48 has a central separator 102 therein to effectively define two spaced film apertures as will be described in greater detail with respect to FIG. 6.

As shown in FIG. 3, the illustrated embodiment is positioned to reproduce a single frame 8 millimeter original. Thus the aperture means 42 is partially covered at the film plane by the canted drum 38. However, the diametrically opposed light opening 46 remains unimpeded for maximum light transfer. Because of the step 50 in the drum 38 only the edges of both the undeveloped film 16 and the original 18 are gripped as clearly shown in FIG. 7.

The drum 38 is movable from the position shown in FIG. 3 to a withdrawn position shown in FIG. 4 and in this withdrawn position is adapted to expose both film apertures for use in printing two side-by-side motion picture films on a single piece of double width stock. The drum 38 has a stepped recess 50 which receives the edge of the unexposed film and permits proper edge support of both films when the drum is in the position shown in FIG. 3. In the position shown in FIG. 4 both films are supported by the recess. Both films are compressed against the drum 38 by the contact roller 20.

When in the position shown in FIG. 4, only the peripheral portion of the film is engaged while in the position shown in FIG. 3 approximately one-half of the film will be engaged if double width stock is employed. This half will be protected from exposure so that a second run can be utilized to expose the other half of the film. The drum is movable in response to rotational movement of the arm 52 and this rotational movement is effected by the manual actuation of knob 54.

The operation of the aperture assembly may be best understood from the cross-sectional view of FIG. 6. A housing 56 is provided for mounting the aperture assembly in picture printing equipment in the manner shown in FIG. 1. All mounting details have been omitted for simplicity of disclosure as those details form no part of the invention. The right hand portion including housing 56, as shown in FIG. 6, is exposed for manual adjustment while the left hand portion is mounted in the equipment 10. A central shaft 58 is rotatably mounted in a bushing 60 which is, in turn, supported within housing 56. The crank 52 is secured to shaft 58 to effect rotation thereof through a predetermined angle.

As shown in FIG. 5, the angle of rotation in the preferred embodiment is approximately 90° as is determined by the quadrant 64 mounted on the face of housing 56. A pin 66 extends through an aperture in the crank 52 and has a resilient extension 62 which engages the quadrant 64. The quadrant 64 is preferably provided with two recesses 68 at the extremes thereof and a uniform channel 70 therebetween. Thus, the pin extension 62 locks the arm 52 in the two extreme positions and engages the slot 70 to guide the crank travel therebetween. The pin 66 is preferably spring-loaded to the extended position and retractable by finger engagement with an outward force upon the knob 54. Knob 54 also is utilized to effect rotation of the crank 52 and consequent axial movement of the drum 38.

A worm gear 72 is secured on shaft 58 and turns therewith. The worm gear 72 has a helical recess 74 which receives a pin 76. The pin 76 is secured in the drum shaft support 78 and the drum shaft support 78 is slidably mounted on shaft 58. Support 78 is secured against rotation in housing 56 by any convenient means. For illustrative purposes, the pin 76 is illustrated extending into an axial slot 80 formed in the housing 56 whereby rotation is prevented. Secured to the shaft support 78 is shaft 82 which is a canted shaft secured to support 78 and slidable therewith on shaft 58. While the angle of cant will depend upon the other parameters in each design, in the instant design an angle of 5° was found to be optimum.

Drum 38 is rotatably mounted on canted shaft 82 through a pair of ball bearings 84 and 86. The ball bearings may be maintained in spaced relationship by a spacer 88 and retained in position with any appropriate means such as rings 90. The bearing portion 38b of drum 38 fits within a corresponding recess 56b of housing 56 and the outwardly extending drum 38 has a central recess 38c, which receives the aperture means 42. The outer surface of the drum is frusto-conical and should match the angle at which the drum shaft is canted. Thus in the preferred embodiment the conic surface 114 is at an angle of 5° to the axis of the drum 38.

The aperture member 42 has a generally cylindrical web 92 at its outer extremity and a supporting disc 94 inwardly thereof. The cylindrical web 92 has a large aperture 46 formed at one side thereof and a shaped opening 48 at the opposite side. The opening 48 terminates in a pair of film apertures 98 and 100 which have vertical and horizontal dimensions corresponding to one frame of film and are spaced apart by a small separator 102. In continuous printers it is not necessary to limit the aperture height to the film frame size but the opening will be determined by the optical system. The supporting disc 94 of the aperture member 42 is secured to a bearing 96 which is slidably mounted on the forward portion of the canted shaft 82. The forward portion of shaft 82 is a bushing 104 with a key slot formed therein. The bearing 96 has a similar key slot therein and is maintained against rotation on bushing 104 by a key 106 interconnecting the two parts.

The shaft 58 has a head 108 secured thereto which is entrapped between the supporting disc 94 of aperture member 42 and a cover plate 110 secured to the supporting disc 94 by a plurality of machine screws 112. Resilient spacers such as teflon spacer 118 and 120 are disposed between the head 108 and the supporting disc 94 and between the head 108 and cover plate 110. Thus, the cover plate 110 secures the aperture member 42 on the head 108 while permitting relative rotation therebetween. Thus, the aperture member 42 is maintained against axial movement relative to the shaft 58 and is maintained against rotation relative to the drum shaft 82.

The operation of the mechanism may be summarized in the following manner. Rotation of the crank 52, by manual engagement with knob 54, produces rotation of worm gear 72 which retracts the shaft 82 and canted drum 38 from the position shown in FIGS. 3 and 6 to the position shown in FIG. 4. As is apparent from the drawings in the position shown in FIGS. 3 and 6, the drum covers one of the two apertures, aperture 100, so that the system is adapted to expose only single width film or one-half of double frame film. Upon retraction to the position shown in FIG. 4, both apertures 98 and 100 are exposed whereby double frame film can be exposed through a double original. Both systems are used in conventional motion picture printing and thus, this ability to adapt the system for either of the two systems is highly desirable.

In addition to this ability, the use of the canted shaft 82 and a rotatable drum 38 having a conic surface 114 removes the portion of the drum 38a which is disposed opposite the apertures 98 and 100 from the path of the light beam as indicated by arrow 44. By virtue of this system of a canted conic drum, it is possible to provide an improved light source with enhanced intensity without redesigning the system or producing any increased heating or energy dissipation within the system.

As shown in FIG. 2, it is possible to dispose an additional optical system 116 within the aperture means 42 if this is desired. Again, by virtue of the increased size of the input opening to the aperture means, greater versatility and light intensity is available in the system.

It will be apparent that the invention may be modified to fit particular requirements of a given system. For example, the use of the drum mounted on a canted shaft will provide advantages in any environment where it is desirable to provide clearance at the point diametrically opposed to the point of film support. Furthermore, the ability to adjust the system for multiple film sizes may be of advantage in various systems which are not necessarily double frame eight millimeter film printers.

Without further elaboration, the foregoing will so fully explain the characteristics of my invention that others may, by applying current knowledge, readily adapt the same for use under varying conditions of service, while retaining certain features which may properly be said to constitute the essential items of novelty defined by the following claims.

I claim:

1. An improved aperture assembly for elongate film comprising aperture means defining a film aperture lying generally in a film plane, a source of light spaced from said aperture means and defining a beam axis substantially normal to said film plane, and a film supporting drum rotatably mounted on an axis defining a small acute angle with respect to said film plane, said angle being sufficiently large that the portion of said drum furthest removed from the film plane does not substantially interfere with the light from said source falling on the aperture, said drum defining a frustoconical film supporting surface rotatable past said aperture means, the shape of said frustoconical surface being related to said acute angle to support said film on said surface parallel to said film plane.

2. The film aperture assembly of claim 1 wherein contact means is disposed adjacent said aperture means and adapted to urge such film against said supporting surface.

3. The film aperture assembly of claim 2 including supply means and take-up means for such film adjacent said film aperture.

4. The film aperture assembly of claim 3 wherein said supply means includes a supply of developed film and a supply of undeveloped film and feed means to guide such film between said supporting surface and said contact means with said developed film toward said light source, and said take-up means includes a take-up storage means for said developed film and a take-up storage means for said undeveloped film.

5. The aperture assembly of claim 2 wherein said aperture means comprises a generally cylindrical portion including said film aperture which is substantially the dimensions of one film frame and an enlarged light opening diametrically opposite said film aperture, the acute angle of said drum axis being such that the periphery of said drum is immediately adjacent said film aperture, conforms to said generally cylindrical portion, and is spaced from said enlarged light opening .

6. The aperture assembly of claim 2 wherein said aperture means comprises a generally cylindrical portion including said film aperture, said cylindrical portion being mounted on a film axis, drum bearing means nonrotatably secured to said cylindrical portion, said bearing means defining a bearing surface disposed at said acute angle to said film axis, and said film supporting drum being rotatably mounted on said bearing means.

7. The aperture assembly of claim 6 wherein said aperture means includes two axially aligned apertures and said film supporting drum is axially shiftable along said film axis to cooperate with said contact means to support such film in spaced relationship to one or both of said apertures.

8. The aperture assembly of claim 7 wherein a housing is provided, a shaft extends outwardly from said housing and rigidly supports said aperture means, said drum bearing means being slidable on said shaft.

9. The aperture assembly of claim 8 wherein pin and helix means are secured in said bearing means and on said shaft whereby relative rotation of said bearing means and shaft produce axial movement of said drum relative to said aperture means.

10. The aperture assembly of claim 9 wherein said bearing means is keyed in said housing against rotation, lever means is mounted on said shaft adjacent said housing to rotate said shaft, and index means is provided in said housing to index said shaft in two positions of rotation corresponding to the two positions of said drum.

11. The aperture assembly of claim 2 including a second film supporting member rotatably mounted adjacent said aperture means and having a second supporting surface adjacent said film aperture whereby said film aperture is disposed between said supporting surface and said second supporting surface whereby such film may be moved therewith and thereon past said aperture.

12. The aperture assembly of claim 1 wherein said second film supporting member is a drum rotatably mounted along said beam axis.

13. The aperture assembly of claim 12 wherein said second film supporting surface is provided with a sprocket wheel to cooperate with such film in driving engagement.

References Cited

UNITED STATES PATENTS

| | | | |
|---|---|---|---|
| 1,209,631 | 12/1916 | Sletten | 95—79 |
| 3,111,249 | 11/1963 | Lazar | 352—80 XR |
| 3,323,434 | 6/1967 | Curtis | 95—77.5 XR |

NORTON ANSHER, Primary Examiner

FRED L. BRAUN, Assistant Examiner

U.S. Cl. X.R.

352—80; 355—111, 117

PO-1050
(5/69)

UNITED STATES PATENT OFFICE
CERTIFICATE OF CORRECTION

Patent No. 3,471,232      Dated October 7, 1969

Inventor(s) William W. Morris

It is certified that error appears in the above-identified patent and that said Letters Patent are hereby corrected as shown below:

Column 3, line 44, "back" should be "backs"

Column 3, lines 69, 70, "diamertically" should be "diametrically"

Column 6, line 73 (Claim 12) - "claim 1" should be "claim 11".

SIGNED AND
SEALED
JAN 6 - 1970

(SEAL)
Attest:

Edward M. Fletcher, Jr.
Attesting Officer

WILLIAM E. SCHUYLER, J
Commissioner of Patent